(12) United States Patent
Johnson et al.

(10) Patent No.: US 6,266,914 B1
(45) Date of Patent: Jul. 31, 2001

(54) SPINNER-TYPE FISHING LURES AND WIRE AND CABLE FISHING LEADERS

(75) Inventors: William B. Johnson, Tulsa, OK (US); Carl J. Berendt, Lake Havasu City, AZ (US)

(73) Assignee: Outdoor Innovations, L.L.C., Tulsa, OK (US)

( * ) Notice: Subject to any disclaimer, the term of this patent is extended or adjusted under 35 U.S.C. 154(b) by 0 days.

(21) Appl. No.: 09/242,317

(22) PCT Filed: Dec. 5, 1997

(86) PCT No.: PCT/US97/22940

§ 371 Date: Feb. 12, 1999

§ 102(e) Date: Feb. 12, 1999

(87) PCT Pub. No.: WO98/24309

PCT Pub. Date: Jun. 11, 1998

Related U.S. Application Data
(60) Provisional application No. 60/032,917, filed on Dec. 6, 1996.

(51) Int. Cl.[7] .................................................. A01K 85/00
(52) U.S. Cl. ............................................................ 43/42.13
(58) Field of Search ................................ 43/42.13, 42.19

(56) References Cited

U.S. PATENT DOCUMENTS

| | | |
|---|---|---|
| 2,108,598 | 2/1938 | Burr . |
| 3,451,305 | 6/1969 | Christensen et al. . |
| 3,758,979 | 9/1973 | Martuch et al. . |
| 3,831,309 | 8/1974 | Martuch . |
| 3,871,123 | 3/1975 | Olson . |
| 3,943,652 | 3/1976 | Aunspaugh . |
| 4,018,308 | 4/1977 | Rogen . |
| 4,107,370 | 8/1978 | Ingraham . |
| 4,197,643 | 4/1980 | Burstone et al. . |
| 4,201,008 * | 5/1980 | Sparkman ............................ 43/42.13 |
| 4,321,854 | 3/1982 | Foote et al. . |
| 4,330,956 | 5/1982 | McCarthy . |

(List continued on next page.)

FOREIGN PATENT DOCUMENTS

| | | |
|---|---|---|
| 43 07 593 C1 | 8/1994 | (DE) . |
| 52095522 A | 8/1977 | (JP) . |
| 62224650 A | 10/1987 | (JP) . |
| 01091729 A | 4/1989 | (JP) . |
| HI-91729 | 4/1989 | (JP) . |
| 02-002311 A | 1/1990 | (JP) . |
| 2041426 A | 2/1990 | (JP) . |
| 3236732 A | 10/1991 | (JP) . |
| 03 272634 A | 12/1991 | (JP) . |
| 03-272634 A | 12/1991 | (JP) . |

(List continued on next page.)

OTHER PUBLICATIONS

Burstone, Charles J. and Morton, John Y., *Chinese NiTi wire—A new orthodontic alloy*, American Journal of Orthodontics, Jun., 1985, pp. 445–452, vol. 87, No. 6, The C. V. Mosby Company.

(List continued on next page.)

*Primary Examiner*—Kurt Rowan
(74) *Attorney, Agent, or Firm*—Alston & Bird LLP

(57) ABSTRACT

An improved fishing lure employing a wire frame (10) having first (14) and second arms (16) that extend in divergent directions with respect to each other. A fish attracting element (18) and a hook (20) are secured to one arm (14), and a spinner (32) is attached to the other arm (16). The wire frame is formed of a nickel titanium alloy which provides flexibility and shape memory that are substantially greater than that provided by conventional stainless steel wire whereby when the lure is pulled through water, it has improved fish attracting action. Wire and cable fishing leaders formed of a nickel titanium alloy are disclosed which exhibit appreciable elongation and resistance to kinking and spiralling.

19 Claims, 7 Drawing Sheets

U.S. PATENT DOCUMENTS

| | | | |
|---|---|---|---|
| 4,510,710 | * | 4/1985 | Hanna .................................. 43/42.13 |
| 4,571,877 | * | 2/1986 | Montgomery ....................... 43/42.13 |
| 4,604,821 | | 8/1986 | Moser . |
| 4,718,191 | * | 1/1988 | Gentry ................................. 43/42.13 |
| 4,772,112 | | 9/1988 | Zider et al. . |
| 4,779,372 | | 10/1988 | Pozo Obeso . |
| 4,815,233 | | 3/1989 | Pingel . |
| 4,895,438 | | 1/1990 | Zider et al. . |
| 4,896,955 | | 1/1990 | Zider et al. . |
| 4,909,510 | | 3/1990 | Sahatjian . |
| 5,022,177 | | 6/1991 | Gibson . |
| 5,111,829 | | 5/1992 | Alvarez de Toledo . |
| 5,203,103 | | 4/1993 | Hawley . |
| 5,207,732 | | 5/1993 | Stark . |
| 5,226,268 | | 7/1993 | Sisson, Jr. . |
| 5,230,348 | | 7/1993 | Ishibe et al. . |
| 5,251,395 | | 10/1993 | Wicklund . |
| 5,303,498 | | 4/1994 | Yutori et al. . |
| 5,381,621 | | 1/1995 | Fuller . |
| 5,442,037 | | 8/1995 | Lee et al. . |
| 5,547,140 | | 8/1996 | Kawabe et al. . |
| 5,586,734 | | 12/1996 | Kawabe et al. . |
| 5,591,686 | | 1/1997 | Hamashima . |
| 5,605,004 | | 2/1997 | Boullt et al. . |
| 5,711,105 | | 1/1998 | Schreifels et al. . |
| 5,749,533 | | 5/1998 | Daniels . |
| 5,875,585 | | 3/1999 | Schreifels et al. . |

FOREIGN PATENT DOCUMENTS

| | | |
|---|---|---|
| 04 121135 A | 4/1992 | (JP) . |
| 04-121135 A | 4/1992 | (JP) . |
| 4124244 A | 4/1992 | (JP) . |
| 06 007061 A | 1/1994 | (JP) . |
| 6108204 A | 4/1994 | (JP) . |
| 6108205 A | 4/1994 | (JP) . |
| 6189653 A | 4/1994 | (JP) . |
| 08-308436 A | 11/1996 | (JP) . |
| 8308436A | 11/1996 | (JP) . |

OTHER PUBLICATIONS

George B. Kauffman and Isaac Mayo: "The Story of Nitinol: The Serendipitous Discovery of the Memory Metal and its Applications" THE CHEMICAL EDUCATOR, vol. 2, No. 2, 1996.

Diter Stoeckel & Weikang Yu: "*Superelastic Ni–ti Wire*" Wire Journal International, vol. 24, No. 1, Mar. 1991, pp. 45–50, SUPERELASTICITY XP002063124.

* cited by examiner

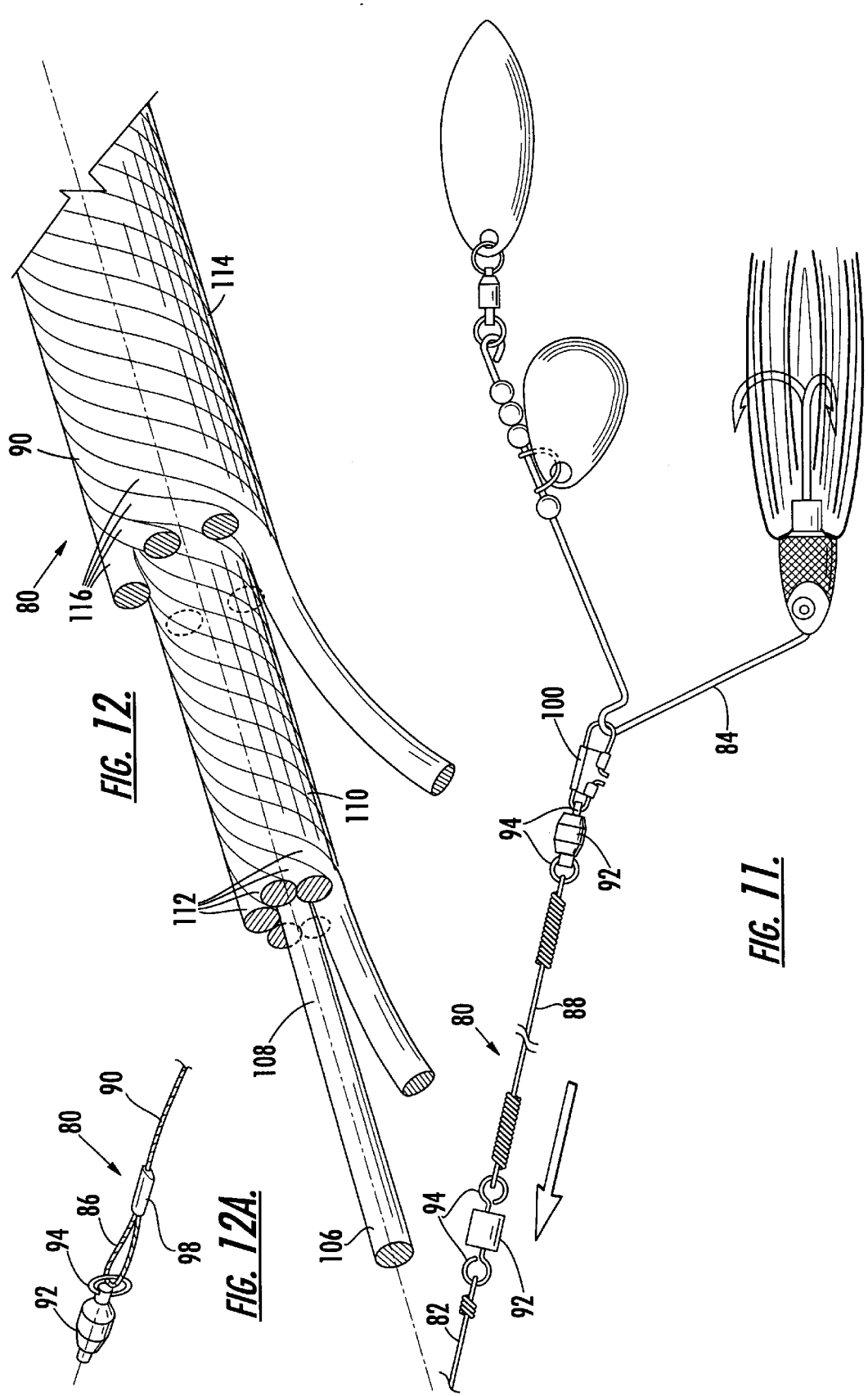

SPINNER-TYPE FISHING LURES AND WIRE AND CABLE FISHING LEADERS

This application claim benefit to Provisional Application 60/032,917 filed Dec. 6, 1996.

FIELD OF THE INVENTION

The present invention relates to fishing lures and to fishing leaders. More particularly, the present invention relates to a wire frame for spinner-type fishing lures having significant flexibility and shape memory as well as tensile strength. The present invention further concerns wire and cable fishing leaders for connecting fishing line to a fishing lure having resistance to kinking as well as significant flexibility and tensile strength.

BACKGROUND OF THE INVENTION

This invention relates to improvements in spinner-type fishing lures and to wire and cable fishing leaders that are used to attach a fishing lure or hook to the end of a fishing line. Artificial fishing lures are available in a wide variety of types, however, an exceedingly popular type of fishing lure is called the "spinner bait". This type of fishing lure emphasizes the use of a spinner to increase the attractiveness of the lure to fish. The spinner is normally formed as a substantially separate part of the lure, that is, the typical spinner bait is formed of a wire body having two arms that extend in a V-shape with the fishing line or leader attached to the wire body at the intersection of the two arms. The two arms, usually formed of a single length of stainless steel wire, extend at an acute angle relative to each other. The typical spinner bait has a body secured to one of the arms and a fish hook extending rearwardly from the body. The other arm of the spinner bait has one or more spinners attached to it. The typical spinner bait is designed so that when it is pulled through the water the spinner arm is vertically positioned above the body arm. A fish is attracted to the moving lure by the dramatic effect caused by the rotating, flashing spinners that rotate above the lure body which is fixed to, or is a part of, the frame body arm.

In recent years spinner baits have become exceedingly popular and have consumed, according to some reports, between 40 to 60% of the fresh water artificial bait market in the United States. The effectiveness of a spinner bait appears to reside in its ability to attract fish to the dressed hook. More specifically, the increased action, vibration, sound and flash produced by a spinner bait, compared to other types of artificial lures, seems to account for the spinner bait's success.

Substantially all of the spinner baits manufactured and sold in the United States and around the world today have a frame made of stainless steel wire which is a popular material for use in forming the frame of a spinner bait because of its ready availability, economy, strength and resistance to corrosion. However, spinner baits having a wire frame made of stainless steel have certain disadvantages and limitations and it is an objective of the present disclosure to provide an improved spinner bait having advantages that make the improved spinner bait substantially superior to commonly available spinner baits that are made with a stainless steel wire frame.

Another important item to fishermen is the leader by which a lure is attached to the end of a fishing line. Most fishing lines in use today are made of synthetic materials, including nylon monofilament, braided nylon and braided polyester. In the past, fishing lines were made of woven cotton, linen or silk, but upon the development and ready availability of extrudable polymers, the monofilament line has substantially replaced all other types of fishing lines.

In assembling a fishing rig, the fishing line is commonly attached to the fishing lure or hook using a fishing leader. Although some anglers attach the fishing lure or hook directly to the end of the fishing line, the more experienced anglers use a fishing leader between the fishing line and the lure in order to protect the fishing line from abrasion and fraying. In particular, monofilament fishing line can be damaged through engagement with a rock or other obstruction in the water, or from being cut or frayed by the teeth, fins or tail of a fish.

Conventional fishing leaders are formed using nylon monofilament or stainless steel wire or cable. Nylon monofilament is more supple than conventional metallic leaders, and further, is less visible and obtrusive, which is advantageous when attempting to attract fish. However, the same concerns that pertain to monofilament fishing line apply to nylon monofilament fishing leaders in that nylon monofilament is generally not as resistant to abrasion and fraying as is metallic wire or cable. Furthermore, the tensile strength of a particular diameter of nylon monofilament is typically less than the tensile strength of a metallic wire or cable of equal diameter.

Thus, high tensile strength metallic wire or cable is used in those instances when nylon monofilament is likely to fail, for example, when big-game fishing, fishing for sharp toothed fish or where the surrounding environment contains edged obstructions or heavy cover. Metallic leaders can be single-strand wire or multi-strand cable. Conventional metallic leaders are commonly constructed of stainless steel because of its high tensile strength, corrosion resistance, ready availability and economy.

A significant problem with conventional stainless steel wire and cable leaders, however, is that the leaders frequently become bent, kinked or spiralled. Once a stainless steel leader is bent or kinked, it is difficult to straighten, and moreover, attempts to repair the leader, can create cyclical stresses resulting in fatigue deformation and even mechanical failure. If a leader becomes bent or kinked during use, the angler could lose not only a hooked fish, but also the fishing tackle attached to the leader which can be expensive to replace. Consequently, a bent or kinked fishing leader must be replaced immediately which can be time consuming and infringe upon valuable fishing time. Also, it is difficult to accurately cast a kinked or spiralled fishing leader which can impede the ability of the angler to accurately place the fishing lure.

Conventional stainless steel leaders also fail to exhibit any significant elongation when subjected to the forces commonly associated with fishing, such as a strike or contact with an obstruction in the water. Consequently, conventional stainless steel leaders transfer the tension created by a hooked fish directly to the fishing line, thereby increasing the likelihood of exceeding the recommended tensile strength of the fishing line.

In seeking better materials for constructing fishing leaders, various combinations of synthetic materials and stainless steel wire or cable have been suggested. One such example of a fishing leader is disclosed in U.S. Pat. No. 3,451,305 to Christensen et al. which discloses a leader having a core of nylon multi-filaments surrounded by braided stainless steel fibers, all of which is covered by a nylon sheathing. Although coating a metallic wire or cable with nylon initially increases the suppleness of the leader, as the coating deteriorates with use, the cable leader becomes less resistant to kinking.

Thus, there is a need for improved materials for use in the construction of both fishing lures and fishing leaders. Such materials, when used in the construction of a fishing lure, must be flexible and have appreciable shape memory. Such materials, when used in the construction of a fishing leader, must be capable of resisting kinking, bending or spiraling, yet be flexible so as not to significantly affect the action of the fishing lure. These materials should also have a relatively high tensile strength and be resistant to corrosion.

SUMMARY OF THE INVENTION

The present invention provides a fishing lure, characterized by high flexibility and shape memory, having a lure frame formed of an elongate wire which, in one preferred embodiment, is bent at an intermediate point forming a bight portion, so as to form two arms which extend divergently from said bight portion to respective outer ends. The elongate wire may be formed of an integral wire. At least one fish attracting element and at least one fish hook is secured to the elongate wire. The at least one fish attracting element is mounted to the wire for rotation about the wire.

In another embodiment of the fishing lure the elongate wire includes an eyelet at one end, two bends of about 90° each along the length thereof so as to form a Z-shaped dog leg, and with the one fish attracting element and the one fish hook being attached to the wire on the side of the dog leg opposite the eyelet.

The elongate wire comprises an alloy having superelastic properties such that the wire has a flexibility and shape memory substantially greater than that of stainless steel. In a preferred embodiment, the elongate wire comprises at least about 40% titanium and may further comprise about 50 to 60% nickel, with other metals not exceeding about 5%. The tensile strength of the elongate wire frame is at least about an order of magnitude equal to that of stainless steel wire of equal diameter. The shape memory of the elongate wire frame is at least about three times that of stainless steel. The elongate wire also has a flexibility that is at least 50% greater than that of stainless steel such that the outer ends of the arms of the fishing lure can be deflected towards each other with a force that is no greater than about 50% of the force required if the elongate wire frame were formed of stainless steel wire of equal diameter.

The present invention further provides a fishing leader for joining a fishing lure to a fishing line and characterized by high strength, flexibility and resistance to kinking. The fishing leader comprises an elongate wire-like member having opposite ends, each of the opposite ends including a loop for attachment to an element used in fishing. A snap-swivel may be attached to one of the loops. A swivel may be attached to the other of the loops.

The elongate wire-like member is formed of an alloy having superelastic properties such that the elongate wire-like member can be elongated at least about 10% before breaking. The elongate wire-like member comprises at least about 40% titanium and may further comprise at least about 50% nickel.

The elongate wire-like member may be either a solid wire or a multi-stranded cable. The cable may comprise a core formed of at least one solid wire strand; an inner layer formed of a plurality of wound strands, the inner layer adjacent and covering the core; and an outer layer formed of a plurality of wound strands, the outer layer adjacent and covering the inner layer. The strands of the inner and outer layers may be of the same or of different diameters. The strands of the inner and outer layer may have the same or a different lay.

A fishing rig characterized by high strength, flexibility and resistance to kinking, is also provided. The rig comprises a lure comprising an elongate wire, at least one fish attracting element secured to the wire, at least one hook secured to the wire, and wherein the wire comprises an alloy comprising at least about 40% titanium. The rig further comprises a leader comprising a wire-like member having opposite ends, each of the opposite ends including a loop, with the lure being attached to one of the loops of the leader, and wherein the wire-like member comprises an alloy comprising at least about 40% titanium. In one specific embodiment, the alloy of the wire of the lure comprises at least about 40% titanium and at least about 50% nickel, and the alloy of the wire-like member of the leader comprises at least about 40% titanium and at least about 50% nickel. A snap-swivel may be provided for rotatably joining the one loop to the lure. A swivel may be attached to the other of the loops, and so that the fishing line may be attached to the switch.

Accordingly, there has been provided a spinner-type fishing lure having significant flexibility and shape memory. There has also been provided wire and cable fishing leader having significant elongation and resistance to kinking and spiralling. In addition, both the spinner-type fishing lure and the wire and cable fishing leader are constructed of an alloy having an appreciable tensile strength.

BRIEF DESCRIPTION OF THE DRAWINGS

FIG. 3 is a cross-sectional view of the lure body of FIG. 1 illustrating the method of attachment of an eyelet at the end of a fish hook to the outer end of the wire frame body arm;

FIG. 11 is an elevation view illustrating an embodiment of a wire fishing leader, according to the present invention, as used to connect a fishing line to a fishing lure;

FIG. 12 is a perspective cutaway view illustrating an embodiment of a multi-stranded cable fishing leader, according to the present invention;

FIG. 12A is an elevational view illustrating a loop formed at the end of a fishing leader using a crimped sleeve;

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as to the embodiments set forth herein; rather, these embodiments are provided so that this disclosure will be thorough and complete and will fully convey the scope of the invention to those skilled in the art. Like numbers refer to like elements throughout.

Figure 1:
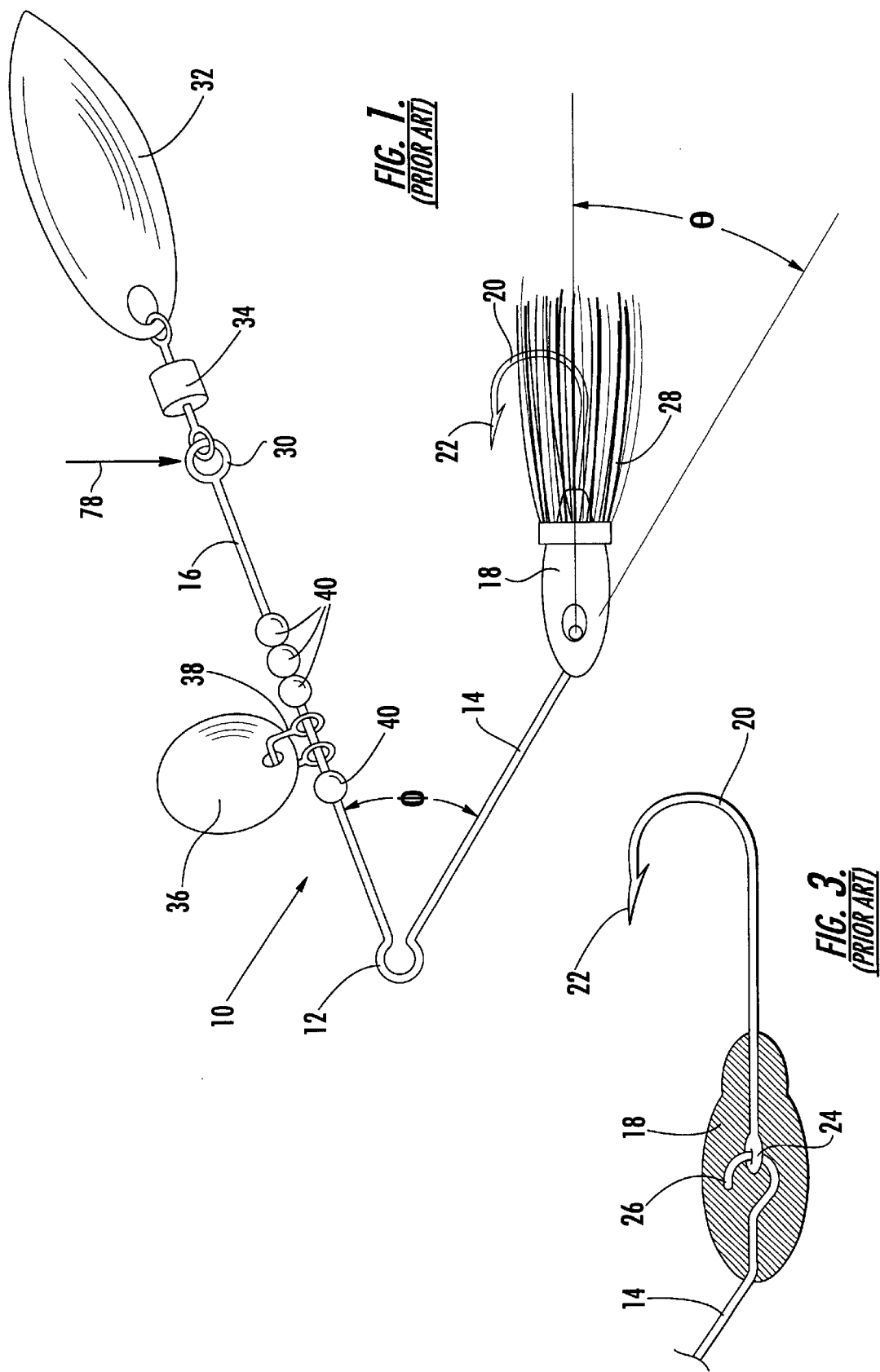
FIG. 1 is an elevational view of a typical spinner bait illustrating a wire frame having a lower, body arm to which a lure body and a fish hook are attached and an upper, spinner arm to which one or more spinners are attached.

Referring now to the drawings, and in particular, to FIG. 1, there is shown a typical spinner bait. More specifically, FIG. 1 illustrates the basic configuration of a spinner bait, but is not intended to be representative of all of the features commonly found in a spinner bait. FIG. 1 is typical of a spinner bait in that it is formed of a wire frame generally indicated by the numeral 10 that is bent in the form of a V-shape having a bight portion 12, a body arm 14 and a spinner arm 16. Using these three basic characteristics, that is, an integral wire frame having a bight portion, a body arm and a spinner arm, a great variety of spinner baits have been manufactured and are on the market today. The shape of the bight portion 12 can vary considerably.

Affixed to the body arm 14 is a body 18 commonly formed of a solid, three-dimensional element intended to attract fish by replicating a naturally occurring fish food, such as a minnow. The body 18 can take on almost an unlimited number of different physical appearances and therefore, the body 18, as illustrated in FIG. 1, is merely emblematic of that usually employed on the body arm 14 of a spinner bait.

Extending rearwardly from the body 18 is a fish hook 20 having a barbed end 22 that extends upwardly towards the spinner arm 16. FIG. 3 shows that in the preferred arrangement, the eyelet 24, formed as an integral part of the typical fish hook, is received by a loop 26 formed in the outer end of the body arm 14. The body 18 is typically molded around the joined fish hook eyelet 24 and a loop 26 formed in the outer end of the body arm 14. Thus, the body 18 serves to retain the hook 20 in proper angular relationship with respect to the body arm 14, however, tensile strength applied to the hook is transferred, not to the body, but to the body arm through the direct linkage of the hook to the body arm.

FIG. 1 shows that the body 18 is provided with a rearward extending skirt 28 usually made up of thin plastic or rubber elements intended to improve the fish attracting characteristics of the body. In a preferred embodiment, skirt 28 is formed of silicon strands and is removable to facilitate replacement in the event the skirt becomes damaged or the angler needs to modify the appearance of the body 18.

The spinner arm 16 is, as the name implies, intended for the attachment of one or more spinners. The spinner arm 16 has, at its outer end, an eyelet 30 as a means for attaching a spinner. In the illustrated arrangement a spinner 32, normally made of thin, highly reflective metal and bent so as to cause it to rotate as the lure is pulled through water, is attached to the eyelet 30 by means of a swivel 34.

More than one spinner can be secured to the spinner arm 16. For instance, in FIG. 1, a second spinner 36 is secured by a wire clevis 38 to spinner arm 16. Spacer beads 40 are slidably received on the spinner arm 16 to correctly position the second spinner 36 with respect to the arm. In the embodiment of FIG. 1, when the lure is pulled through water, the second spinner 36 will move rearwardly on the spinner arm until the rearward most spacer bead 40 engages the eyelet 30.

The lure depicted in FIG. 1 is emblematic of spinner baits commonly employed today. The invention herein resides not in the arrangement of the lure of FIG. 1 but in the construction of the lure which dramatically increases its effectiveness, utility and durability.

Figure 2:
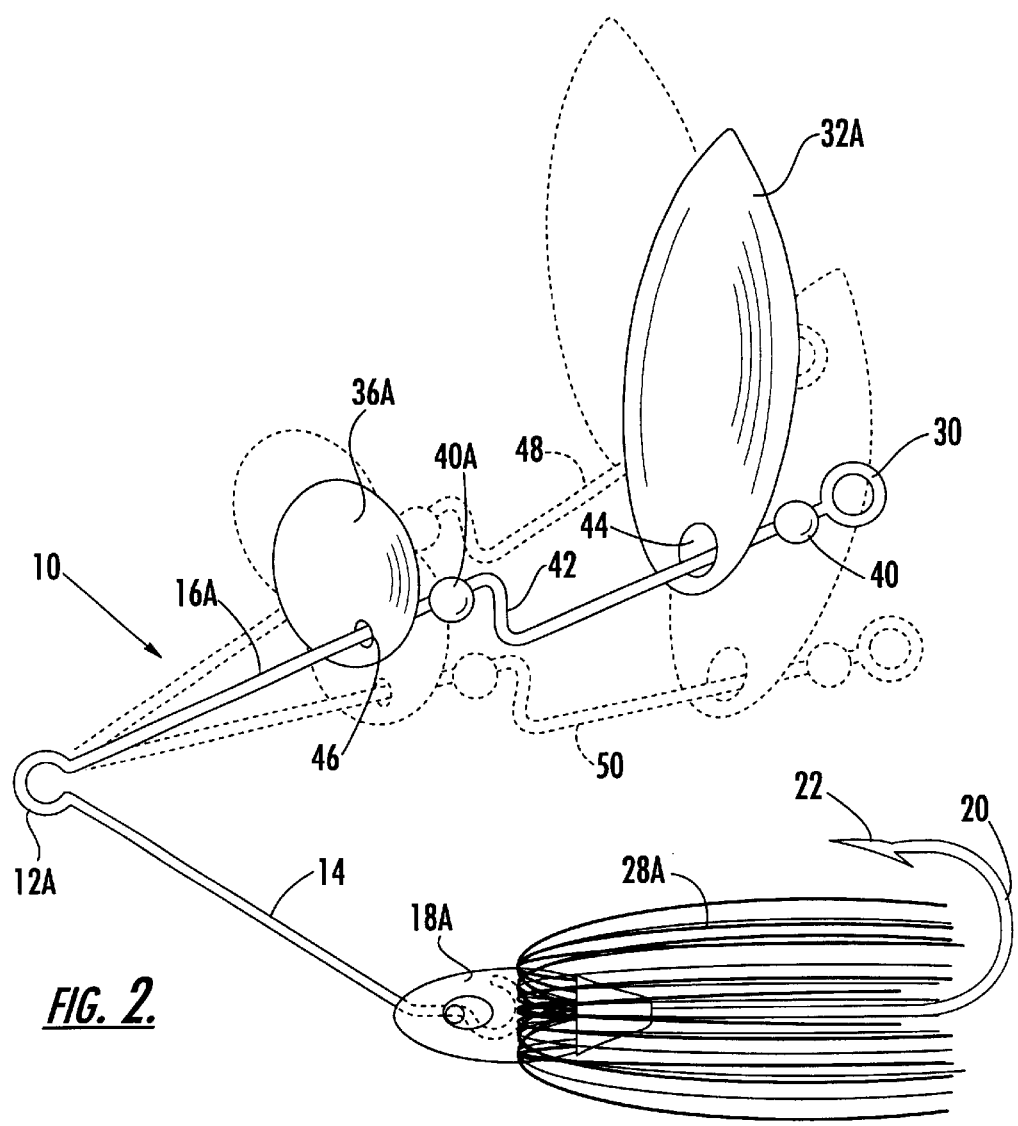
FIG. 2 is an alternate embodiment of a spinner bait formed of a wire frame with an upper spinner arm and a lower body arm and illustrating in dotted outline, the advantages obtained by the spinner bait of this invention in which the wire frame and the spinners are arranged so as to increase the action of the spinner bait as it moves through water.

Before discussing the details of the innovations which constitute the essence of the invention, a brief reference will first be made to FIG. 2 which shows an improved spinner bait, different from FIG. 1 in the shape of the spinner arm, as well as, and more importantly, in the way the spinners are secured to the spinner arm. In FIG. 2, spinner arm 16A has two 90° bends therein intermediate the curved bight portion 12A and the eyelet 30 forming an integral dog leg portion 42. By means of a spacer bead 40A, a second swivel 36A is rotatably positioned on spinner arm 16 prior to the dog leg 42. In the embodiment of FIG. 2, spinners 32A and 36A are different in an important way than those illustrated in FIG. 1. In the embodiment of FIG. 2, the first spinner 32A is secured, not by means of a swivel, but by an opening 44 therein that receives spinner arm 16A. In like manner, the second spinner 36A has an opening 46 hat receives spinner arm 16A. This arrangement causes both spinners 32A and 36A to rotate completely circumferentially around spinner arm 16A as the lure is pulled through, water. By employing spinners that have openings therein that receive the spinner arm to thereby cause the spinners to rotate completely around the spinner arm, increased action of the spinner arm is obtained as indicated by the dotted outline of the upper and lower positions of the spinner arm. The upper position being indicated by the numeral 48 and the lower position by the numeral 50.

This increased action as the lure is pulled through water, increases the spinner arms vibration resulting in the production of increased sound. Further, the vibration of the spinner arm causes the spinners 32A and 36A to produce more action and flash. When the benefits of the method of mounting spinners to a spinner arm (as illustrated in FIG. 2) are combined with the advantages of a spinner arm having increased flexibility, as disclosed herein, a synergistic result is achieved producing a spinner bait having a significantly increased ability to attract fish.

A further variation of the spinner type fishing lure is the in-line spinner. Conventional in-line spinners have a straight metallic frame, typically constructed of stainless steel wire, extending from an eyelet to the body of the lure. A spinner is secured to the wire frame of the in-line spinner using a wire clevis. When using in-line spinners, one problem encountered by anglers is that the in-line spinner lure has a tendency to rotate about the axis of the fishing line as it moves through the water. The rotation of the in-line spinner causes the fishing line to become twisted which can adversely affect the action of the lure.

Figure 4:
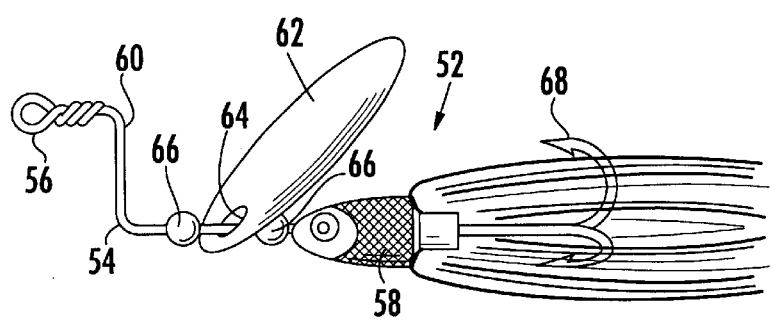
FIG. 4 is an elevational view illustrating an in-line spinner bait constructed according to the present invention.

Referring to FIG. 4, there is shown an improved in-line spinner which effectively avoids twisting of the fishing line. The in-line spinner 52 includes a wire frame 54 having two 90° bends between the eyelet 56 and the body 58 forming a Z-shaped dog leg 60. A spinner 62 may be secured by means of an opening 64 therein that receives the wire frame 54, or alternatively, the spinner may be secured to the wire frame using a wire clevis (not shown). Spacer beads 66 are slidably received on the wire frame 54 to correctly position the spinner. Most in-line spinner lures include a treble hook 68 which can be secured to the wire frame 54 in the same manner as the hook 20, shown in FIG. 3, is connected to wire frame 14.

The Z-shaped dog leg 60 offsets the body 58 and the spinner 62 from the axis of the fishing line which effectively prevents the lure from rotating about that axis and thereby twisting the line. The use of a Z-shaped dog leg 60, as illustrated in FIG. 4, could not be accomplished with conventional stainless steel frames because stainless steel has a relatively low resistance to cyclical fatigue. However, an in-line spinner constructed according to the present invention has significant flexibility and resistance to cyclical fatigue, thus allowing the lure to effectively perform in the disclosed configuration.

As previously indicated, commercial embodiments of spinner baits employ a wire frame which is commonly made of stainless steel wire. Also previously indicated, stainless steel has the advantages of strength, corrosion resistance, ready availability and economy. Although spinner baits employing stainless steel wires have generally been effective, as evidenced by the wide popularity of spinner baits, the stainless steel wire frames of commercially available spinner baits are easily deformed or distorted. In an attempt to increase the flexibility of the wire frame of a spinner bait made of stainless steel, some models have included a frame in which the arm having a spinner thereon is tapered, that is, the diameter of the wire is reduced in the direction towards the spinner. While tapering one or both arms of a stainless steel wire frame helps improve a spinner bait, nevertheless, it has been discovered that the effectiveness of a spinner bait can be substantially and dramatically improved by improving the characteristics of the wire frame of which the spinner bait is formed. Further, the arms of the improved wire frame do not have to be tapered. In short, the essence of this invention is a spinner bait having a significantly improved wire frame in which the wire frame is formed of a metal alloy completely dissimilar from stainless steel in at least two significant characteristics. First, a wire frame is disclosed that has a shape memory at least three times greater than stainless steel. Second, a wire frame is disclosed that has flexibility at least about 50% greater than stainless steel. The wire frame of this invention has an ultimate tensile strength or breaking strength which, although not equal to that of stainless steel, is of the same order of magnitude as the breaking strength of stainless steel.

The spinner bait of this invention provides improved characteristics as compared with known types of spinner baits, particularly those made of stainless steel. The improved spinner bait is more effective in attracting fish. This characteristic is achieved by the significantly increased flexibility of the wire frame. As illustrated in FIG. 2, by employing a wire frame 10 of great flexibility, the spinner arm 16A is free to flex at a substantially greater degree with respect to the body arm 14 as the lure is pulled through water, as illustrated by the dotted outlines 48 and 50 of the spinner arm. This increased flexibility augments the action of spinners 32A and 36A, or any other type of spinners that are secured to the spinner arm 16. The increased action achieved by significantly increased flexibility of the wire frame attracts fish by motion as well as by increased sound and vibration which is produced by the lure moving through water.

When a fish strikes the lure, the mouth of the fish (at least some of the time) grasps the lure in such a way that the spinner arm 16 must be deflected sufficient to enable the mouth of the fish to close upon the body 18 and the hook 20. The increased flexibility achieved by the wire frame of this invention thereby increases the chances that fish will close upon the hook and that the spinner arm 16 will not interfere with the catch of a striking fish.

When a lure is cast by an angler, the lure frequently strikes objects in the water, such as rocks, or engages objects as it is pulled through the water. Consequently, the arms 14 and 16 are frequently bent. Further, when a spinner bait is struck by a fish or in the landing of a fish, the spinner bait arms are frequently bent or distorted. When the arms of a spinner bait become crooked or out of alignment such that the arms are not in a uniform plane, the lure, when pulled through water, may not travel in a vertical plane, causing the lure to move in such a way as to decrease the effectiveness of the lure. A deformed spinner bait lure can move through water with the arms horizontal with respect to each other or at other angles. For this reason, anglers using spinner baits available on the market today are frequently required to rebend or reshape the spinner arms. Not only is this time consuming but it is sometimes difficult to realign a spinner bait so that it performs to the degree intended by the manufacturer. By the provision of an improved wire frame having greatly improved shape memory, the possibility of the wire frame being distorted to the point where the lure fails to function is significantly minimized.

Figure 7:
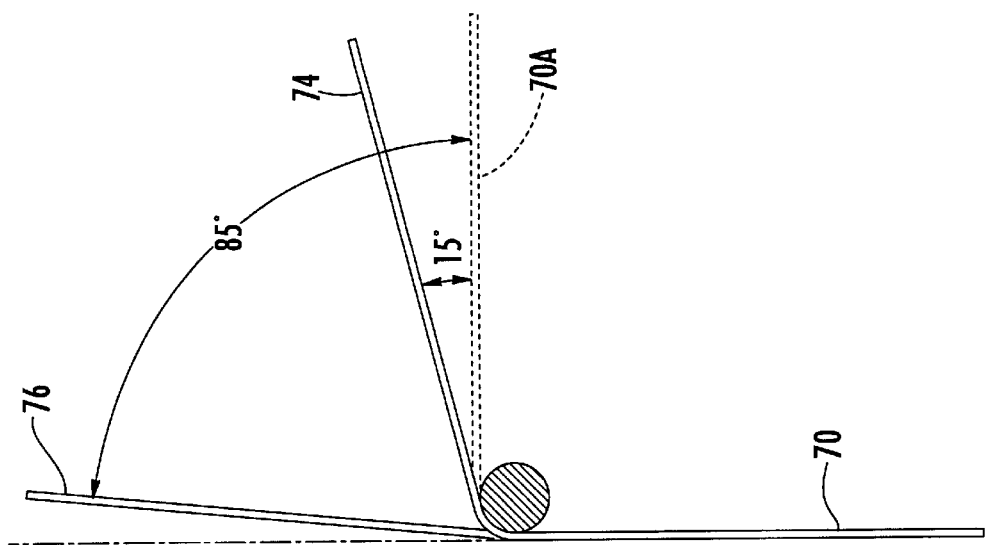
FIG. 7 illustrates a comparison of the shape memory of two different types of wire that can be employed in forming the frame of the fishing lures of FIGS. 1 and 2, one being the type presently employed in commercially available spinner baits and the other type employed in practicing this invention.
Figure 6:
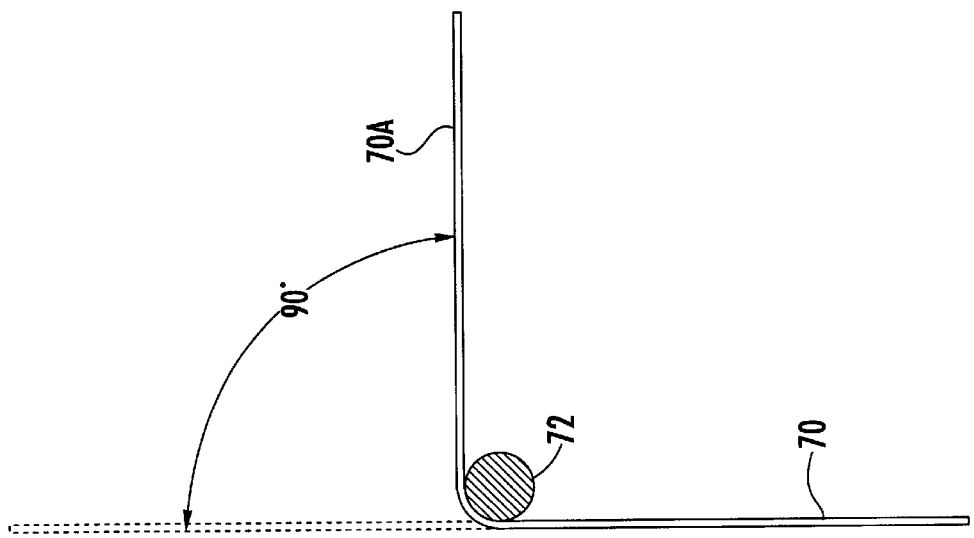
FIG. 6 shows a wire bent at an angle of 90° around a cylindrical mandrel.
Figure 5:
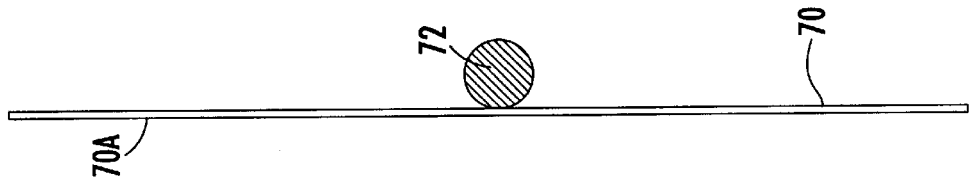
FIG. 5 is a diagrammatic view illustrating a method of testing materials of which the wire frames of the fishing lures of FIGS. 1 and 2 are made when practicing this invention.

FIGS. 5 through 8 show how some important characteristics of a metal alloy are determined. FIGS. 5 through 7 particularly, show how the shape memory characteristic of a metal alloy is measured. FIG. 5 shows a wire 70 that is a candidate for use to form a wire frame 10 of a spinner bait. The wire 70 is initially straight and is placed against a cylindrical mandrel 72. The wire 70 can be of various diameters, however, spinner baits of the type commonly employed particularly for fresh water fishing in the United States and in other countries of the world, typically employ a wire diameter of about 0.035 inches. The spinner bait of the present invention preferably employs a wire frame having a diameter between about 0.03 to 0.05 inches. The mandrel 72 typically has a diameter of 0.25 inches. To evaluate a wire 70, it is bent at an angle of 90° around mandrel 72 to the position shown in FIG. 6. Bending is accomplished utilizing a straight edge, that is, the first part of the wire 70 is maintained straight and the wire is bent so that the bent portion 70A extends in a straight line with respect to the mandrel 72. After bending, the wire 70 is released and the angle with respect to the horizontal to which the wire returns is measured. In FIG. 7, the angle to which a typical stainless steel wire returns is indicated by the numeral 74. On the average, this angle is generally about 15°, indicating a permanent deformation of about 75°. In contrast, a preferred wire, according to this invention, for use in forming the frame of an improved spinner bait has shape memory so that the wire returns, on the average, to an angle of about 85° to the horizontal as indicated by the numeral 76. In other words, the wire has a permanent deformation of only about 5° after having been bent to an angle of 90°. This dramatically improved shape memory insures that a lure formed of the improved wire frame when bent, for any reason, is substantially less likely to result in a permanent deformation of the shape of the frame.

While FIGS. 5 through 7 have been described in terms of a shape memory of a wire, this characteristic is sometimes referred to as "springback" but, in any event, a wire that meets the requirements of this invention for use in making a frame of a spinner bait must have a springback or shape memory that is at least three times greater than that of stainless steel.

The next important characteristic of the improved wire frame for a spinner bait of this invention is the flexibility of the wire of which the frame is formed. Flexibility has two important functions in achieving an improved fishing lure. First, by increased flexibility the action of the lure is substantially improved as the lure moves through water, as has been previously described with reference to FIG. 2, in which the dotted outlines 48 and 50 of spinner arm 16 show how the spinner arm can flex.

The second major advantage of increased flexibility of the wire frame is that it enhances the fish catching capability of the lure. A fish normally strikes a lure with its mouth fully open. When closing upon the lure, it is necessary in many instances that the fish fully deflect the arms of the frame towards each other in order to bend the spinner arm 16 towards the body arm 14 sufficiently to fully expose end 22 of hook 20. Stated in another way, the spinner arm 16 must be displaced so that the hook 20 is fully exposed to enable the hooks to be engaged by the mouth of a striking fish. When the frame is constructed, in accordance with the principal of this invention, of a metal alloy that provides significantly increased flexibility, the force required to move the spinner arm 16 in order to fully expose the hook 22 is substantially reduced, this diminishing the possibility that the fish strike will not result in capture of the fish. Referring to FIG. 1, and assuming that the body 18 is held stationary, the force necessary to close the spinner arm 16 downwardly to expose the barbed end 22 of hook the 20 is indicated by the numeral 78. In the practice of this invention, when the wire frame 10 is configured to have a spinner arm 16 with a length of about 2⅛" from the bight portion 12 to the eyelet 30, and the frame is made of a wire having a diameter of about 0.035 inches, the force 78 should not exceed about 250 grams. This force is in the range of about 50% of a force 78 required if the frame 10 is constructed using stainless steel wire.

An additional characteristic of the wire frame 10 is that it must be formed of a metal having a sufficient tensile strength to hold a large fish without breaking. In general, the tensile strength of the metal of which frame 10 is formed must exceed that of the strongest fishing line that would be used with the lure. Stainless steel wire of about 0.035 inch diameter has been more or less the standard utilized for spinner bait lures and the wire of which the frame of the lure of this invention is formed must have a comparable breaking strength, that is, it must have a breaking strength at least of the same order of magnitude as that of stainless steel.

In summary, the improved spinner bait of this invention has a frame 10 that is characterized, as compared with the most commonly available existing spinner baits, by: (a) a springback or shape memory at least about three times greater than stainless steel; (b) a flexibility of at least 50% greater than stainless steel or, stated in another way, has a stiffness which is at least about 50% less than stainless steel; and (c) a tensile strength that is of the same order of magnitude as that of stainless steel.

Tests have shown that the improved spinner bait of this invention can be achieved when the frame 10 is formed of a wire made of an alloy that possesses superelastic properties. Superelasticity describes the property of an alloy to return to its original shape upon unloading after a substantial deformation. For example, a superelastic alloy can be strained ten times more than stainless steel without being plastically deformed. Superelasticity in alloys of nickel and titanium is caused by the formation of a stress induced martensite, which can be brought about through cold working with a subsequent heat treatment at approximately 400–600 degrees Celsius. This process is described in detail in the article, Dietr Stoeckel and Weikang Yu, *Superelastic Ni-Ti Wire,* Wire Journal International, Mar. 1991, pp. 45–50, which is incorporated herein by reference.

It has been determined that wire made of a metal alloy comprising at least about 40% titanium, and preferably also about 50% nickel, meets the requirements of this invention. Successful results have been achieved utilizing an alloy that is about 45% titanium with the balance nickel and small amounts of copper, iron, chromium, vanadium, hafnium and/or palladium. The preferred alloy is about 50–60% nickel, and about 40–50% titanium, with other metals not exceeding 5%.

As previously stated two important requirements of the metal alloy of which the wire frame is formed are flexibility and shape memory. It has been determined that alloys in which the percent of titanium is greater has improved shape memory whereas when the percentage of nickel is greater, flexibility is increased. Therefore, there is a trade off between flexibility and shape memory according to the percentages of nickel and titanium and consequently a good compromise to achieve a highly improved spinner bait utilizes a wire frame of about 55% nickel and about 45% titanium with minor amounts of other metals making up the alloy.

A commercially available alloy that meets the requirements of the wire frame of the improved spinner bait is commonly referred to as NITINOL, an alloy that was developed in about 1960 by the United States Naval Ordinance Laboratory at Silver Springs, Md. The term "NITINOL" is derived from Ni—nickel; Ti—titanium; N—naval; O—ordinance and L—laboratory. NITINOL wire is commercially available from Sports Wire, located in Langley, Okla. This commercially available NITINOL wire is rolled and heat treated to provide a wire that is tempered with the grain of the metal in a longitudinal axis to enhance the shape memory characteristic of this metal, flexibility and shape memory being programmed into the wire through chemistry and cold working. The resultant NITINOL wire is highly resistant both to wear and to impact deformation.

Figure 8:
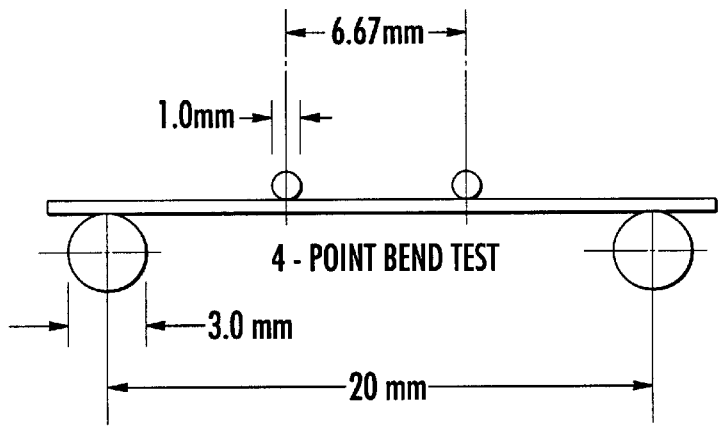
FIG. 8 illustrates diagrammatically a type of test as employed to measure the flexibility, in contrast to stiffness, of different kinds of wire used to form the wire frame of fishing lures of the type illustrated in FIGS. 1, 2 and 4.
Figure 9:
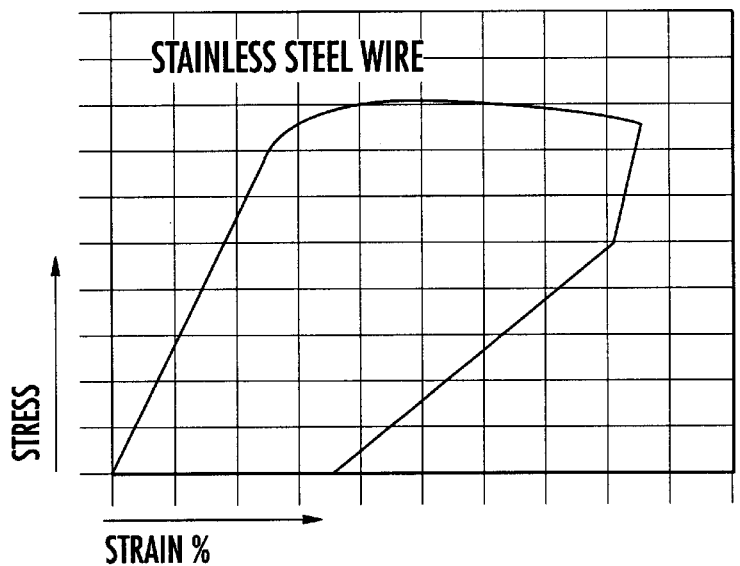
FIG. 9 is a chart illustrating the relationship between stress and strain as applied to a stainless steel wire of the type commonly employed for making spinner baits available on the market today, the graph showing the relationship between stress and strain as stress is applied and then removed from a wire using the bending test as illustrated in FIG. 8.
Figure 10:
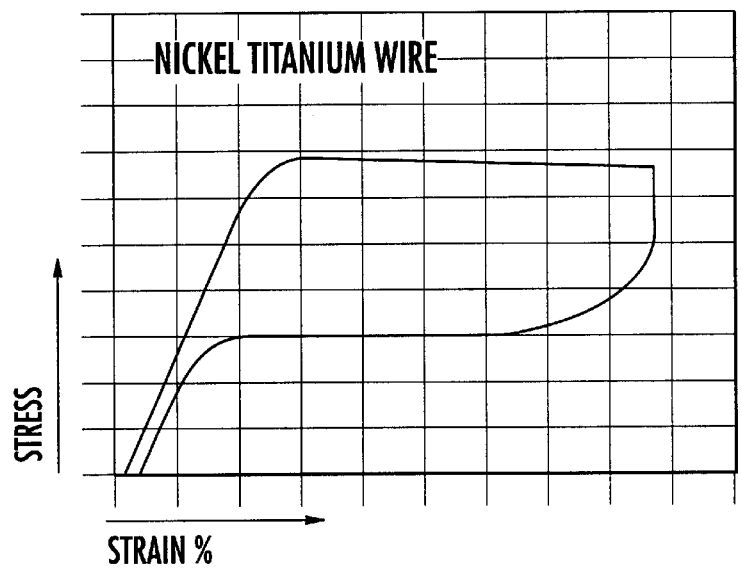
FIG. 10 is a representative diagram of a type of wire applicable for an improved spinner bait of this invention illustrating the relationship between the stress and strain applied to the wire using the four point bending test illustrated in FIG. 8 as the wire is first stressed and then released, showing, by comparing graphs of FIGS. 9 and 10, the dramatic difference in the shape memory of the improved type of wire compared to stainless steel wire.

The characteristics of a wire formed of an alloy comprising nickel and titanium, which has about 55% nickel and about 45% titanium is illustrated in FIG. 10. This chart shows that as strain is applied to the wire, using a test procedure such as the procedure as illustrated in FIG. 8, the wire springs back to near its original linear configuration. The chart of FIG. 9 shows that, in contrast, a deflection of a stainless steel wire results in a substantial permanent deformation of the wire. Further, the charts of FIGS. 9 and 10 illustrate the different strain/stress response characteristics of a wire formed of a nickel and titanium alloy as compared to a stainless steel wire.

Another important characteristic of a spinner bait made according to the principals of this invention, wherein the wire frame is formed of a nickel and titanium alloy is that the improved wire frame can support many more bending cycles, without breaking, than can stainless steel under the same cyclical stress conditions. Preliminary tests have revealed that a wire formed of a nickel and titanium alloy is capable of undergoing 200 or more bending cycles, while a wire formed of stainless steel and having the same diameter can generally undergo only 5–10 bending cycles. Further, stainless steel undergoes a greater reduction in tensile strength after having been bent than does a wire formed of a nickel and titanium alloy.

Alternatively, an alloy commonly referred to as "beta titanium" may also be used in the construction of wire frame 14 according to the present invention. Such an alloy may for example comprise at least about 40% titanium, and may be predominately titanium, with the remainder of the alloy being formed of a stabilizing alloying element such as manganese, iron, chromium, cobalt, nickel, copper, aluminum, tin and zirconium. Further disclosure of the properties of "beta titanium" is set forth in Burstone et al. U.S. Pat. No. 4,197,643 issued Apr. 15, 1980, which is incorporated herein by reference.

Another aspect of this invention is an improved fishing leader for use in attaching a fishing lure to the end of a fishing line, a representative leader being shown in FIG. 11. Referring to FIG. 11, there is shown a fishing leader 80, according to the present invention, attached at one end to a fishing line 82 and at the other end to a fishing lure 84 of the type described above. The fishing leader 80 is an elongate wire-like member which can be constructed of either a single-strand solid wire 88, or as is shown in FIG. 12, a multi-stranded cable 90.

A swivel 92 may be attached to one or both ends of the fishing leader 80 in order to rotatively attach the leader to the fishing line 82 and/or the fishing lure 84. The swivel 92, when used to join the fishing leader 80 to the fishing line 82, prevents both the leader and the line from becoming twisted or spiralled during use. Similarly, a swivel 92 used to join the fishing leader 80 to the fishing lure 84 will prevent the leader from becoming twisted or spiralled as a result of the spinning or vibratory action of the lure as well as prevent the leader from affecting the fish attracting movement of the lure. As illustrated in FIG. 11, swivels 92 are available in many different shapes and sizes and are selected depending on the type fish the angler intends to catch.

A snap 100 may be used either alone or in conjunction with a swivel 92. The snap 100 is used to facilitate connecting a fishing lure 84 or a hook (not shown) quickly and easily. A snap 100 may also be used to connect one or more fishing leaders 80 in series. The combination of a snap 100 and a swivel 92 is commonly known as a snap-swivel.

The fishing leader 80 may be attached to the swivel 92 by either tying the leader directly to the eyelet 94 of the swivel as is shown in FIG. 11, or alternatively, as shown in FIG. 12A, by threading the end of the leader through the eyelet and then forming a loop 96 at the end of the leader. The loop 96 is secured using one or more sleeves 98 which are securely crimped around the leader. The sleeves 98 are available in various sizes and are selected based on the diameter of the fishing leader 80. A loop 96 may be used whether the fishing leader 80 is formed of solid wire 88 or cable 90. The sleeve 98 is crimped using a crimping tool as is well known in the art. The size of the loop 96 may vary and typically depends on the size of the swivel 92. However, the loop should not be overly large in order to avoid distracting the fish.

Figure 16:
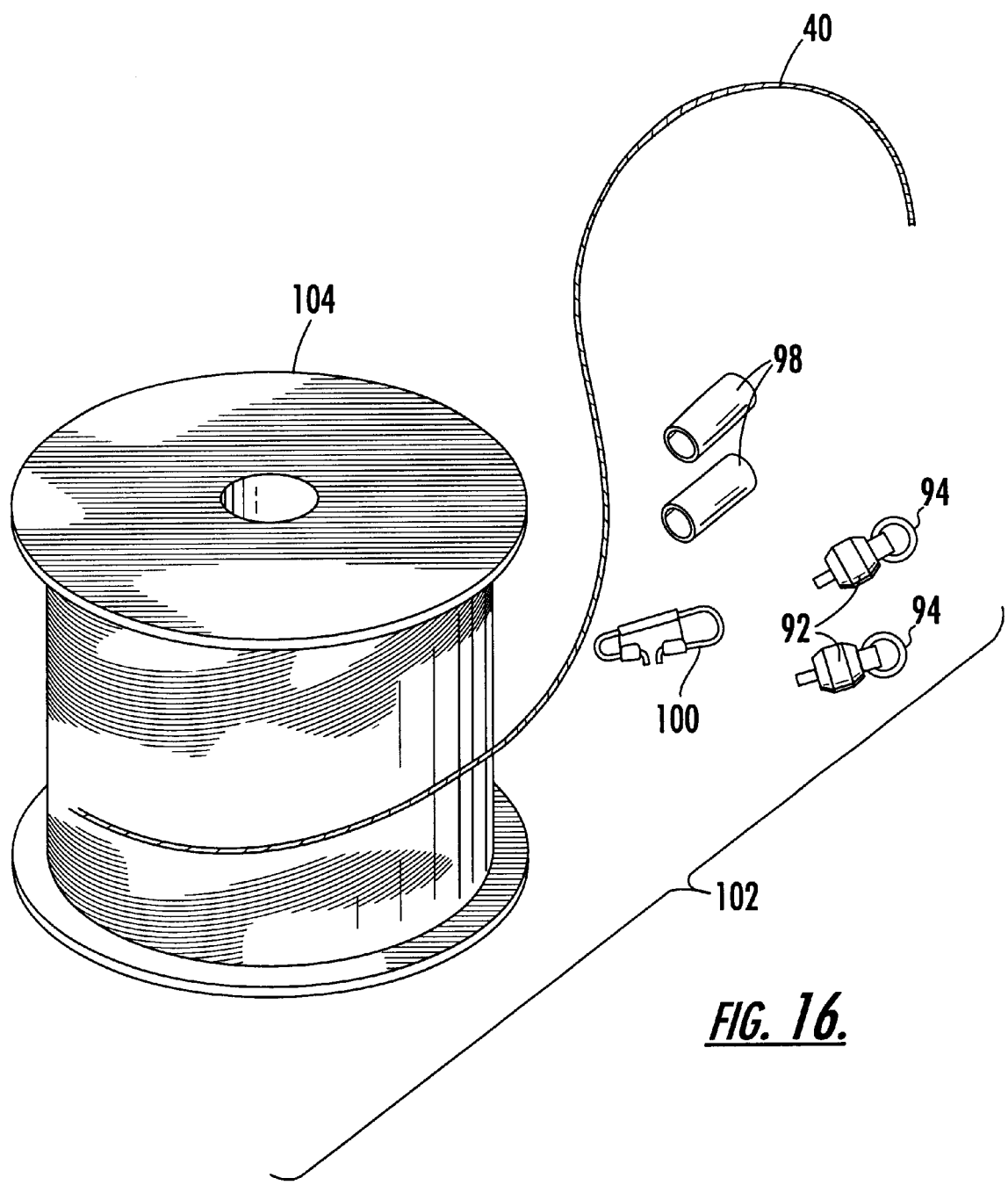
FIG. 16 is an exploded view illustrating a fishing kit containing the components necessary to construct fishing leaders according to the present invention.

The length of the fishing leader 80 is generally a function of the size and type of the fish the angler intends to catch as well as the existence of any edged obstructions in the water, including rocks or heavy vegetation. As such, it is desirable in some instances for an angler to be able to purchase the materials necessary to construct fishing leaders 80 of varying lengths. Referring to FIG. 16, a fishing leader kit 102 would include a spool 104 of either solid wire 88 or cable 90, along with a plurality of swivels 92, sleeves 98, and snaps 100. In constructing a fishing leader 80, the desired length of leader material, whether it be solid wire 88 or cable 90, is cut from the spool 104. Although the ends of the fishing leader 80 may be tied directly to either the fishing line 82 or the fishing lure 84, it is preferable to form loops 96 at both ends of the leader. The loops 96 are formed using sleeves 98. A swivel 92 can be connected to each loop 96 by threading the leader material through the eyelet 94 of the swivel when forming the loop. Lastly, the sleeves 98 are securely crimped using a conventional crimping tool, also known as crimping pliers, which may be obtained at most tackle shops.

As previously indicated, the fishing leader 80, according to the present invention, may advantageously be formed of either a single-strand solid wire 88 or a multi-stranded cable 90. Both the wire 88 and the cable 90 are constructed of a highly elastic and ductile alloy having significant shape memory and flexibility as well as resistance to kinking. More specifically, it has been determined that a wire 88 or a cable 90 made of an alloy formed of both titanium and nickel, wherein nickel is about 55–56% of the composition and the balance is titanium, provides at least 50% greater flexibility than that provided by stainless steel, is more resistant to kinking and spiralling than stainless steel, while at the same time providing a tensile strength of the same order of magnitude as that provided by stainless steel.

As with the spinner-type fishing lure of the present invention, successful results have been achieved utilizing an alloy that is at least about 40% titanium, and preferably also about 50% nickel. As a specific example, a preferred alloy is about 45% titanium and 55% nickel with minor amounts of other metals including copper, iron, chromium, vanadium, hafnium and/or palladium making up the remainder of the alloy. The preferred alloy is about 50–60% nickel, and about 40–50% titanium with other metals not exceeding 5%. Such an alloy has the advantages of significantly increased flexibility and shape memory so that the possibility of permanent deformation of the leader is greatly reduced. As such, a fishing leader 80, constructed according to the present invention, can support many more bending cycles than a similar leader constructed of stainless steel, up to several hundred, without breaking, thus substantially increasing the useful life expectancy of the fishing leader.

A fishing leader wherein wire 88 or cable 90 is made of a nickel and titanium alloy of about 55% nickel and about 45% titanium can be stretched or elongated at least about 10% or greater of its length without permanent deformation. This is compared to stainless steel wire commonly employed for fishing leaders which can usually tolerate elongation of not more than about 3% without breaking or permanent deformation. Stainless steel cable commonly employed for fishing leaders can usually tolerate elongation of not more than about 5% without breaking or permanent deformation. The ability of the wire 88 or cable 90 to stretch or elongate reduces the strain applied to the fishing line 82 and to the fishing lure 84 when a fish strikes, thereby reducing the possibility of the fish breaking either the lure or the line. Further, the elongation reduces the chance that a fish will tear loose from the lure 84, that is, the successful capture rate of fish striking a lure is enhanced by the fishing leader 80 having greater elasticity.

As previously indicated, a commercially available alloy that meets the requirements of the fishing leader 80 according to the present invention is referred to as NITINOL and is commercially available from Sports Wire, Langley, Okla. A nickel and titanium alloy, as exemplified by commercially available NITINOL, is preferred for use in forming the fishing leader 10 of the present invention. Alternatively, an alloy commonly referred to as "beta titanium" may also be used in the construction of the fishing leader 80 according to the present invention. As previously indicated, such an alloy is at least about 40% titanium, with the remainder of the alloy being formed of a stabilizing alloying element such as manganese, iron, chromium, cobalt, nickel, copper, aluminum, tin and zirconium.

Figure 13:
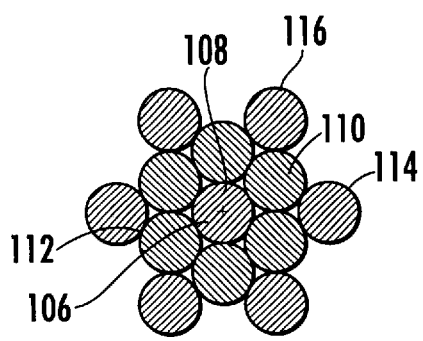
FIG. 13 is a sectional view illustrating the positioning of the strands in the cable fishing leader of FIG. 12.

Referring now to FIGS. 12 and 13, it has been determined that a fishing leader 80 constructed of a nickel and titanium alloy in the form of a multi-stranded cable 90 provides exceptional resistance to kinking, as well as high tensile strength, and flexibility. Preferably, the cable 90 is formed of a core 106, an inner layer 110 and an outer layer 114. The core 106 is formed of one or more individual strands 108. In one embodiment, where the cable 90 is 36.5 pound test, the core 106 is formed of a single strand 108 of #1 NITINOL wire having an approximate diameter of 0.006 inches. Alternatively, where the cable 90 is 50 or 80–100 pound test, the core 106 may be formed of a single strand 108 of #1 NITINOL wire having an approximate diameter of 0.007 or 0.0094 inches, respectively. However, it should be noted that the number of strands 108 as well as the strand diameter may be modified to obtain greater or less pound test cable 90. Where more than one strand 108 is utilized, the strands may be aligned in a parallel relation, twisted or braided.

The inner layer 110, which is formed adjacent to and around the core 106, is constructed of a plurality of strands 112 that are wrapped at a predetermined pitch and helix angle. In order to obtain variations in the diameter and flexibility as well as in the pound test of the cable 90, the number of individual strands 112, the strand diameter and the pitch may be varied. In one embodiment, where the cable 90 is 36.5 pound test, the inner layer 110 is formed of six strands 112 of #1 NITINOL wire, each strand having an approximate diameter of 0.006 inches. The strands are wrapped using a left hand lay having a pitch of approximately 0.050 inches. Alternatively, where the cable 90 is 50 or 80–100 pound test, the inner layer 110 may be formed of six strands 112 of #1 NITINOL wire, each strand having an approximate diameter of 0.007 or 0.0094 inches, respectively.

The outer layer 114, which is formed adjacent to and around the inner layer 110, is constructed of a plurality of strands 116 that are also wrapped at a predetermined pitch and helix angle. In order to obtain variations in the diameter and flexibility as well as in the pound test of the cable 90, the number of individual strands 116, the strand diameter and the pitch may be varied. In one embodiment, where the cable 90 is 36.5 pound test, the outer layer 114 is formed of six strands 116 of #1 NITINOL wire, each strand having an approximate diameter of 0.006 inches. The strands are wrapped using a left hand lay having a pitch of approximately 0.062 inches. Alternatively, where the cable is 50 or 80–100 pound test, the outer layer 114 may be formed of six strands 116 of #1 NITINOL wire, each strand having an approximate diameter of 0.007 or 0.0094 inches, respectively.

In an alternate embodiment of a 50 or 80–100 pound test cable (not shown), the outer layer may be formed of six strands of #1 NITINOL wire, each strand having an approximate diameter of 0.007 or 0.0094 inches, respectively. The outer layer is wrapped around a braid or core bundle of three or more strands, each core strand having a diameter smaller than the diameter of the strands used to form the outer layer such that the total diameter of the core is equal to or greater than the diameter of an individual outer layer strand.

Further variations in stiffness, strength and springiness may be obtained by varying the lay of the inner layer 110 and the outer layer 114. Specifically, where the inner layer 110 and the outer layer 114 are wound in the same direction, known as a "lang-lay", the cable 90 used to form the fishing leader 80 will have greater suppleness and springiness than where the inner layer and the outer layer are wound in different directions, known as a "regular lay". Moreover, where the direction of lay of the inner layer 110 and the outer layer 114 is the same, the individual strands 112, 116 are less likely to wear excessively and thus the strength of the cable 80 is improved. Notably, using the same direction of lay for both layers in conventional cables or wire ropes has typically made the cable or wire rope more susceptible to kinking or untwisting when compared to cables or wire ropes using a regular lay. It has been determined, however, that using a metal alloy of nickel and titanium to form the individual strands 112, 116 results in a cable 90 that has superior resistance to kinking, even when formed using a "lang-lay".

Figure 14:
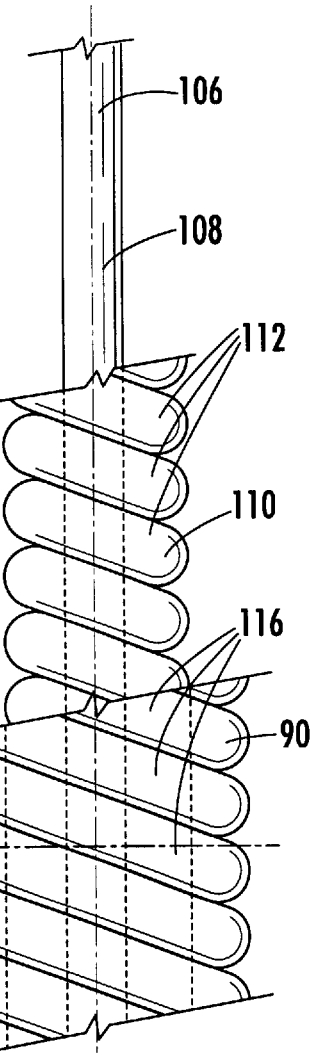
FIG. 14 is a plan cutaway view illustrating the helix angle of the outer layer of the multi-stranded cable fishing leader of FIG. 12.
Figure 15:
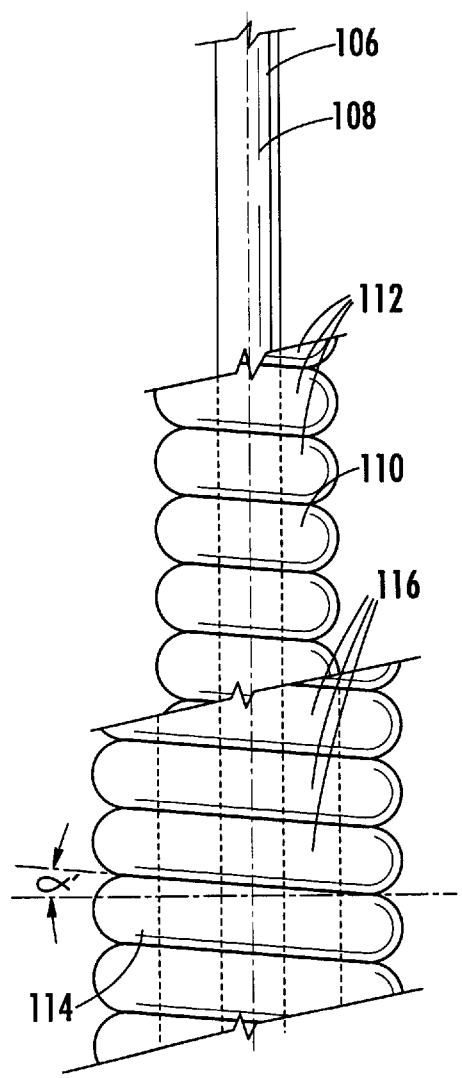
FIG. 15 is a plan cutaway view illustrating a variation in the helix angle of the multi-stranded cable fishing leader of FIG. 12.

Referring to FIGS. 14 and 15, it will be noted that variations in the helix angle of the wrap of the outer layer will also adjust the stiffness and ability of the cable 90 to elongate during use. A cable 90 having a smaller helix angle will have a greater flexibility and elongation than will a cable having a larger helix angle.

Once constructed, the cable 90 should be subjected to a heat straightening process carried out at a temperature of between 450–500 degrees Celsius. This heat treating process relieves the stresses created in the individual strands from the winding process. Additionally, it should be noted that when the NITINOL wire or strands are drawn down to the finished diameter, prior to formation into the finished cable 90, the strands are subjected to a heat treatment at approximately 400–650 degrees Celsius in order to transform the alloy into a superelastic material. The strands can also be subjected to an etching process whereby the strands are bathed in a mild acidic solution, and are then rinsed.

While particular embodiments of the invention have been described, it will be understood, of course, that the invention is not limited thereto since modifications may be made by those skilled in the art, particularly in light of the foregoing teachings. It is therefore contemplated, by the appended claims, to cover any such modifications that incorporate those features of these improvements in the true spirit and scope of the invention.

What is claimed is:

1. A fishing lure comprising:
   a lure frame formed of an integral length of metal wire having first and second arms, with said arms extending divergently from a curved bight portion to respective outer ends;
   at least one fish attracting element secured to said first arm;
   at least one fish hook secured to said second arm; and
   wherein said wire comprises an alloy comprising at least about 40% titanium and at least about 50% nickel, so that the fishing lure comprises shape memory at least about three times greater than stainless steel.

2. A fishing lure according to claim 1 wherein said alloy comprises about 50 to 60% nickel, and about 40 to 50% titanium, with other metals not exceeding about 5%, and wherein said wire has a diameter between about 0.03 to 0.05 inches.

3. A fishing lure according to claim 1 wherein said lure frame comprises an alloy having superelastic properties.

4. A fishing lure according to claim 1 wherein said one fish attracting element is mounted to said wire for rotation about the wire.

5. A fishing lure comprising:
   a lure frame formed of an integral length of metal wire having first and second arms, with said arms extending divergently from a curved bight portion to respective outer ends;
   a first fish attracting element secured to said first arm;
   a second fish attracting element secured to said second arm;
   a fish hook secured to one of said arms; and
   wherein said metal wire comprises an alloy comprising at least about 40% titanium and at least about 50% nickel such that the metal wire has a flexibility and shape memory substantially greater than that of stainless steel, whereby the lure exhibits improved fish attracting action when pulled through water.

6. A fishing lure according to claim 5 wherein said alloy comprises about 50 to 60% nickel and about 40 to 50% titanium.

7. A fishing lure according to claim 5 wherein said lure frame is formed of wire having a shape memory that is at least about three times that of stainless steel.

8. A fishing lure according to claim 5 wherein said lure frame is formed of wire having a flexibility that is at least 50% greater than that of stainless steel.

9. A fishing lure according to claim 5 wherein said lure frame has flexibility such that said outer ends of said arms can be deflected towards each other with a force that is no greater than about 50% of the force required if said frame is formed of stainless steel wire of equal diameter.

10. A fishing rig characterized by high strength, flexibility and resistance to kinking, the rig comprising:
    a lure comprising:
       an integral length of metal wire having first and second arms, with said arms extending divergently from a curved bight portion to respective outer ends;
       at least one fish attracting element secured to said first arm;
       at least one fish hook secured to said second arm; and
       wherein wire comprises an alloy comprising at least about 40% titanium and at least about 50% nickel, so that the fishing lure comprises shape memory at least about three times greater than stainless steel; and
    a leader comprising:
       an elongate member having opposite ends, each of the opposite ends including a loop, with said lure being attached to one of said loops of said leader.

11. The fishing rig according to claim 10 further comprising a snap-swivel rotatably joining said one loop to said lure.

12. The fishing rig according to claim 11 further comprising a swivel attached the other of said loops.

13. The fishing rig according to claim 10 wherein said elongate member of said leader comprises an alloy comprising at least about 40% titanium.

14. The fishing rig according to claim 13 wherein said elongate member of said leader comprises an alloy comprising at least about 40% titanium and at least about 50% nickel, so that said leader comprises high strength, flexibility and resistance to kinking.

15. A fishing lure comprising:
    a lure frame formed of an integral length of metal wire having first and second arms, with said arms extending divergently from a curved bight portion to respective outer ends;
    at least one fish attracting element secured to said first arm;
    at least one fish hook secured to said second arm; and
    wherein said wire comprises an alloy comprising at least about 40% titanium and at least about 50% nickel so that the fishing lure comprises flexibility and shape memory such that said wire has a recovery percentage of at least about 94% after being bent around a cylindrical mandrel to an angle of approximately 90 degrees.

16. A fishing lure according to claim 15 wherein said alloy comprises about 50 to 60% nickel, and about 40 to 50% titanium, with other metals not exceeding about 5% and, wherein said wire has a diameter between about 0.03 to 0.05 inches.

17. A fishing lure according to claim 15 wherein said lure frame comprises an alloy having superelastic properties.

18. A fishing lure according to claim 15 wherein said lure frame is formed of wire having a flexibility that is at least 50% greater than that of stainless steel.

19. A fishing lure according to claim 15 wherein said one fish attracting element is mounted to said wire for rotation about the wire.

* * * * *